United States Patent
Ittelson (10) Patent No.: US 11,930,134 B2
(45) Date of Patent: **\*Mar. 12, 2024**

(54) MESSAGE-BASED DEVICE-SIDE TELEPHONE CALL TO VIRTUAL MEETING ELEVATION

(71) Applicant: Zoom Video Communications, Inc., San Jose, CA (US)

(72) Inventor: Brendan James Ittelson, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,615

(22) Filed: Sep. 13, 2022

(65) Prior Publication Data

US 2023/0007126 A1 Jan. 5, 2023

Related U.S. Application Data

(63) Continuation of application No. 17/161,203, filed on Jan. 28, 2021, now Pat. No. 11,477,325.

(51) Int. Cl.
*H04M 3/56* (2006.01)
*H04L 65/1089* (2022.01)
*H04M 3/42* (2006.01)

(52) U.S. Cl.
CPC ........ *H04M 3/563* (2013.01); *H04L 65/1089* (2013.01); *H04M 3/42382* (2013.01); *H04M 3/567* (2013.01)

(58) Field of Classification Search
None
See application file for complete search history.

(56) References Cited

U.S. PATENT DOCUMENTS

| 6,694,351 | B1 | | 2/2004 | Shaffer et al. | |
| 6,750,897 | B1 | * | 6/2004 | Moshrefi | H04N 7/147 |
| | | | | | 348/E7.083 |
| 6,975,622 | B2 | * | 12/2005 | Korycki | H04M 7/1255 |
| | | | | | 709/204 |

(Continued)

OTHER PUBLICATIONS

International Search Report and Written Opinion dated Apr. 13, 2022 in corresponding PCT Application No. PCT/US2022/014130.

*Primary Examiner* — Hemant S Patel
(74) *Attorney, Agent, or Firm* — Young Basile Hanlon & MacFarlane, P.C.

(57) ABSTRACT

A telephone call is elevated to a virtual meeting while maintaining the telephone call as an audio channel of the virtual meeting for an audio-only caller. During a telephone call, one of the participants of the telephone call requests to switch the telephone call to a virtual meeting. To enable an audio-only caller participating in the telephone call to switch to the virtual meeting, a message is transmitted to the phone device of the audio-only caller. Responsive to an interaction with the message at the phone device, the phone device is connected to the virtual meeting in which the telephone call is maintained as the audio channel at least for the audio-only caller. The specific form and content of the message is based on whether a client application associated with a web service used to implement the virtual meeting is installed on the phone device.

20 Claims, 8 Drawing Sheets

(56) References Cited

U.S. PATENT DOCUMENTS

| | | | |
|---|---|---|---|
| 8,744,420 B2* | 6/2014 | Cranfill | H04N 23/661 |
| | | | 455/416 |
| 10,142,464 B1* | 11/2018 | Cairns | H04W 8/18 |
| 11,477,325 B2* | 10/2022 | Ittelson | H04L 65/1069 |
| 2003/0142635 A1* | 7/2003 | Roher | H04L 12/1818 |
| | | | 379/202.01 |
| 2004/0120498 A1 | 6/2004 | Sylvain | |
| 2007/0118656 A1 | 5/2007 | Anderson et al. | |
| 2008/0039010 A1 | 2/2008 | Vance et al. | |
| 2008/0260116 A1 | 10/2008 | Didcock | |
| 2011/0149811 A1 | 6/2011 | Narayanaswamy | |
| 2011/0206196 A1* | 8/2011 | Isaacson | G06Q 10/10 |
| | | | 379/142.06 |
| 2011/0249079 A1 | 10/2011 | Santamaria et al. | |
| 2013/0091298 A1 | 4/2013 | Ozzie et al. | |
| 2015/0049157 A1 | 2/2015 | Krishnamoorthy et al. | |
| 2018/0032997 A1 | 2/2018 | Gordon et al. | |
| 2018/0160074 A1 | 6/2018 | Mercredi et al. | |
| 2020/0177647 A1 | 6/2020 | Ravichandran | |
| 2020/0304547 A1 | 9/2020 | Lu et al. | |

* cited by examiner

MESSAGE-BASED DEVICE-SIDE TELEPHONE CALL TO VIRTUAL MEETING ELEVATION

CROSS-REFERENCE TO RELATED APPLICATION(S)

This application is a continuation of U.S. patent application Ser. No. 17/161,203, filed Jan. 28, 2021, the entire disclosure of which is herein incorporated by reference.

BACKGROUND

Virtual meetings help people all around the world to connect with one another every day in a variety of business and personal settings. A virtual meeting may be video-enabled to allow participants to see each other in real-time and may also accommodate participants interacting with others through audio alone. Virtual meeting platforms use network connections with participant devices to facilitate audio and/or video communications between participants. The growing ubiquity of network-connected devices enables more and more people to communicate over virtual meetings every day.

SUMMARY

Disclosed herein are, inter alia, implementations of systems and techniques for elevating a telephone call to a virtual meeting.

One aspect of this disclosure is a method, which includes detecting a request to switch a telephone call to a virtual meeting, in which at least one participant of the telephone call is an audio-only caller. A message associated with the virtual meeting is transmitted to a phone device of the audio-only caller. Responsive to an interaction with the message at the phone device, the phone device is connected to the virtual meeting. The telephone call is maintained as an audio channel of the virtual meeting for the audio-only caller.

Another aspect of this disclosure is a server device, which includes a memory and a processor. The processor is configured to execute instructions stored in the memory. The instructions include instructions to detect a request to switch a telephone call to a virtual meeting. Responsive to an authentication of an audio-only caller participating in the telephone call based on whether a client application associated with a web service used to implement the virtual meeting is installed on a phone device of the audio-only caller, the phone device is connected to the web service to allow the audio-only caller to access the virtual meeting. The telephone call is maintained as an audio channel of the virtual meeting for the audio-only caller.

Yet another aspect of this disclosure is a system, which includes a database and a server device. The database stores information associated with phone devices used to access virtual meeting software. The server device runs switching software. The switching software is configured to, responsive to a request to switch a telephone call to a virtual meeting implemented using the virtual meeting software, authenticate an audio-only caller participating in the telephone call using information associated with a phone device of the audio-only caller stored in the database. The phone device is then connected to the virtual meeting software, wherein the telephone call is maintained as an audio channel of the virtual meeting for the audio-only caller.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A virtual meeting platform may provide many different ways for its users to connect to one another. For example, users can use a virtual meeting to connect over video, or they can connect over an audio-only call, for example, using telephony services. Sometimes during an audio-only call, one or more of the participants may wish to elevate the communication to a video call. However, it is generally not easy for an audio-only caller participating over a telephony connection to join a virtual meeting even if the audio-only caller has a client application used for the virtual meeting service installed on their phone. This may, for example be because the audio-only participant in such a case still needs to switch from a telephone application to the client application and thereafter enter a meeting number to join the virtual meeting. One solution may involve the virtual meeting service switching the audio-only caller from telephony audio to voice over IP (VOIP) audio; however, that switching may take some amount of time to complete, during which the audio-only caller misses a portion of the conversation. That solution thus does not improve the user experience.

Implementations of this disclosure address problems such as these by elevating a telephone call to a virtual meeting while maintaining the telephone call as an audio channel of the virtual meeting for an audio-only caller. During a telephone call, one of the participants of the telephone call requests to switch the telephone call to a virtual meeting. To enable an audio-only caller participating in the telephone call to switch to the virtual meeting, a message is transmitted to the phone device of the audio-only caller. Responsive to an interaction with the message at the phone device, the phone device is connected to the virtual meeting in which the telephone call is maintained as the audio channel at least for the audio-only caller. The specific form and content of the message is based on whether a client application associated with a web service used to implement the virtual meeting is installed on the phone device.

Figure 1:
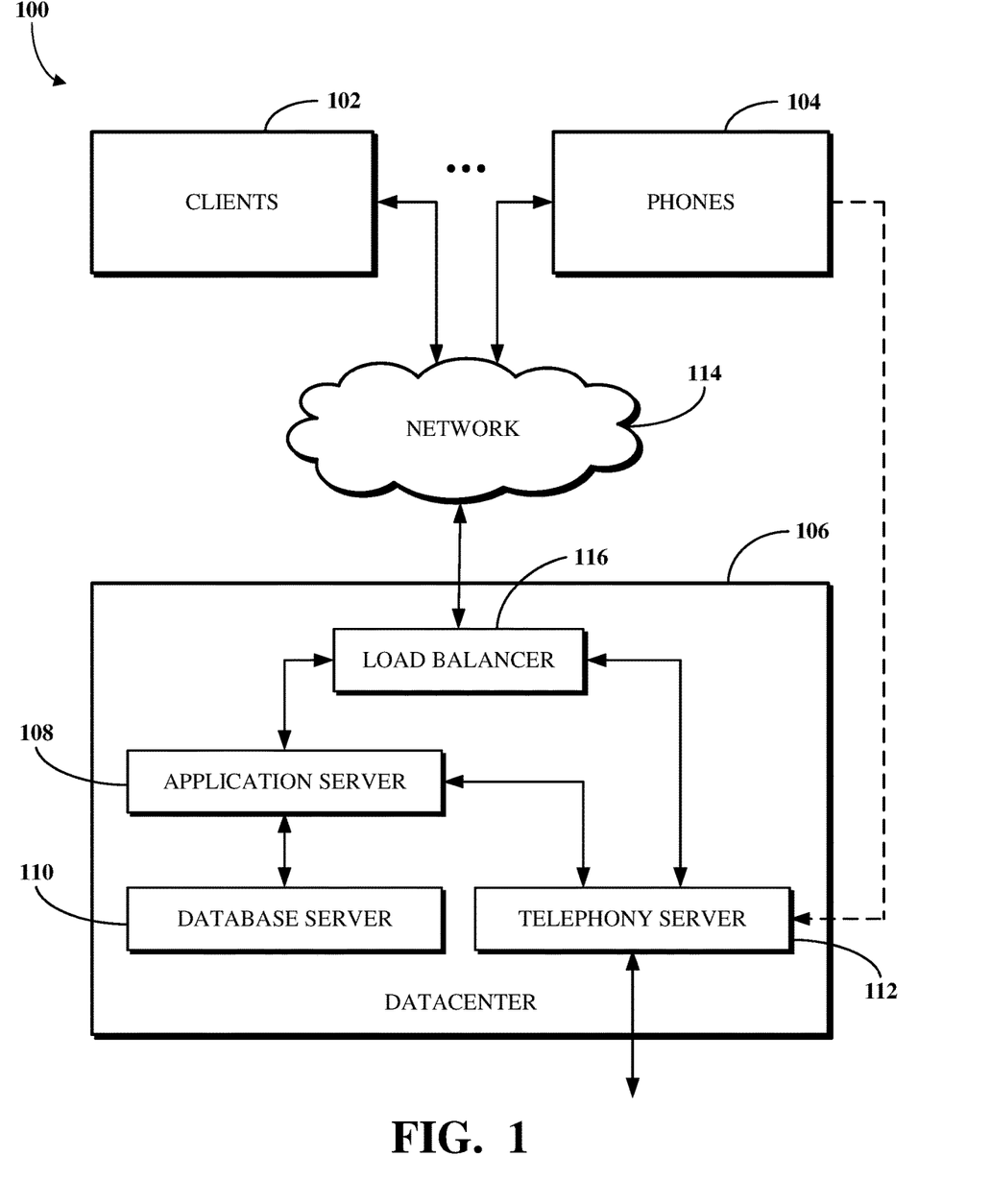
FIG. 1 is a block diagram of an example of an electronic computing and communications system.

To describe some implementations in greater detail, reference is first made to examples of hardware and software structures used to elevate a telephone call to a virtual meeting. FIG. 1 is a block diagram of an example of an electronic computing and communications system 100, which can be or include a distributed computing system (e.g., a client-server computing system), a cloud computing system, a clustered computing system, or the like. The system 100 connects various clients 102 and/or phones 104 to services implemented within or otherwise using a datacenter 106. The system 100 can connect a number of clients 102 and/or phones 104 or can have a configuration of clients or phones different from that generally illustrated in FIG. 1. For example, and without limitation, the system 100 can connect hundreds or thousands of clients and/or phones.

A client 102 may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a device. In some implementations, a client can be implemented as a single physical unit or as a combination of physical units. In some implementations, a single physical unit can include multiple clients.

A phone 104 may be or otherwise refer to one or both of a phone device or a phone application such as a softphone. For example, a phone 104 may be a smart phone or other cell phone which may or may not be configured to run mobile applications, such as a client 102. In another example, a phone 104 may be a desk phone, such as a desktop unit configured to at least send and receive calls and includes an input device for receiving a telephone number or extension to dial to and an output device for outputting audio and/or video for a call in progress. In yet another example, the phone 104 may be a softphone representing telephony functionality of a client 102. A phone 104 may or may not be VOIP-enabled.

The datacenter 106 includes one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers.

The datacenter 106 includes servers used for implementing software services. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106.

In some implementations, one or more of the servers 108 112 can be a non-hardware aspect implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to the clients 102 and at least partially to the phones 104. The software services may be or include virtual meeting software which enables audio, video, and/or other forms of virtual meetings between multiple devices (e.g., between ones of the clients 102, between ones of the phones 104, or between ones of the clients 102 and ones of the phones 104), such as to facilitate a conference between the users of those devices. The virtual meeting software can include functionality for hosting, presenting scheduling, joining, or otherwise participating in a virtual meeting. The virtual meeting software may further include functionality for recording some or all of a virtual meeting and/or documenting a transcript for the virtual meeting. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client 102 as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client 102. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to ones of the clients 102 and ones of the phones 104 which are VOIP-enabled devices configured to send and receive calls over a network, for example, a network 114. In particular, the telephony server 112 includes a session initiation protocol (SIP) zone and a web zone. The SIP zone enables a client 102 or a VOIP-enabled phone 104, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client 102 or VOIP-enabled phone 104 and directs same to a destination device. The SIP zone may include one or more call switches for routing the telephony traffic. For example, to route a VOIP call from a first VOIP-enabled client to a second VOIP-enabled client within the same domain or network, the telephony server 112 may initiate a SIP transaction between a first client and the second client using a PBX. However, in another example, to route a VOIP call from a VOIP-enabled client to a client or phone which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between ones of the clients 102 and/or between ones of the phones 104. When incoming telephony traffic for delivery to a client 102 or a phone 104 originating from outside the telephony server 112 is received, a SBC receives the traffic and forwards it to a call switch for routing to the client 102 or the phone 104.

The web zone receives telephony traffic from a client 102 or a phone 104, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 102 and the phones 104 communicate with aspects of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof. In some implementations in which one or more of the phones 104 is not a VOIP-enabled device, those one or more phones 104 may communicate other than via the network 114.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 102, by the application server 108, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
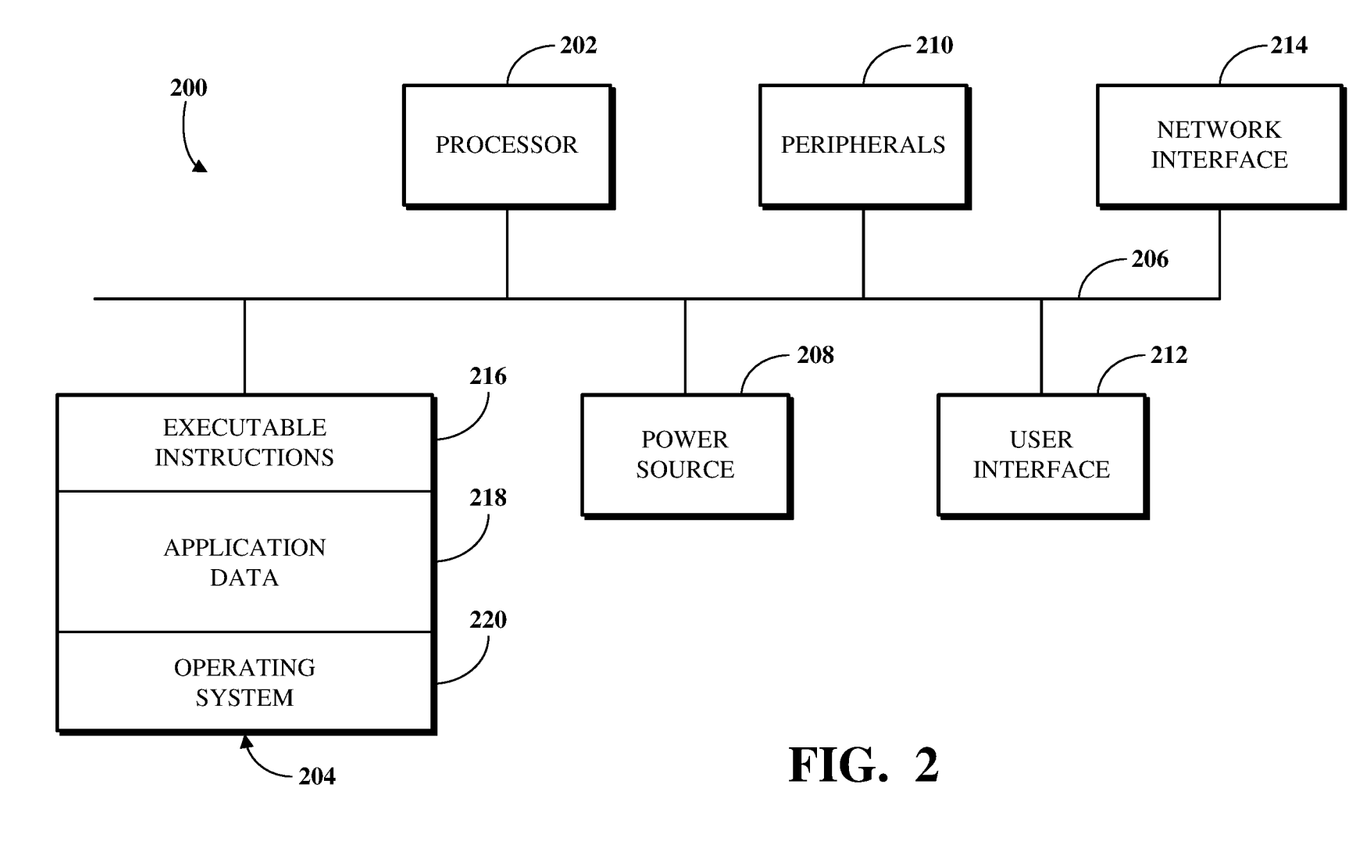
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the gateway 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
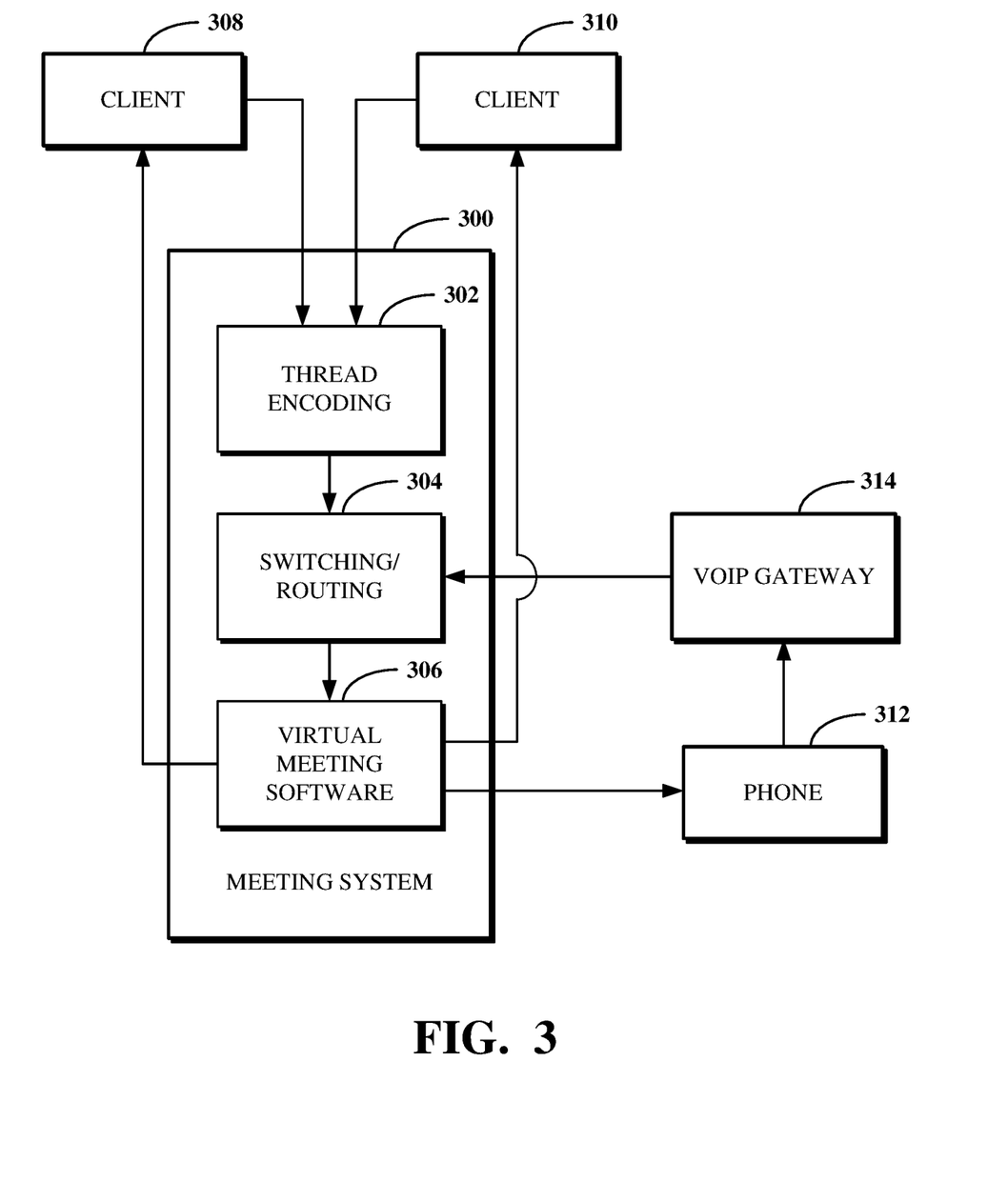
FIG. 3 is a block diagram of an example of a meeting system for delivering virtual meeting software services in an electronic computing and communications system.

FIG. 3 is a block diagram of an example of a meeting system 300 for delivering virtual meeting software services in an electronic computing and communications system, for example, the system 100 shown in FIG. 1. The meeting system 300 includes a thread encoding tool 302, a switching/routing tool 304, and virtual meeting software 306. The meeting system 300 enables use of the virtual meeting software 306 by clients and phones, such as clients 308 and 310 and phone 312. For example, one or both of the clients 308 or 310 may be a client 102 shown in FIG. 1. In another example, the phone 312 may be a phone 104 shown in FIG. 1. The meeting system 300 may in at least some cases be implemented using one or more servers of the system 100. Although two clients and a phone are shown in FIG. 3, other numbers of clients and/or other numbers of phones can connect to the meeting system 300.

A virtual meeting includes transmitting and receiving video, audio, and/or other data between clients and/or phones of virtual meeting participants. Each of the client 308, the client 310, and the phone 312 may connect through the meeting system 300 using separate input streams to enable users thereof to participate in a virtual meeting together using the virtual meeting software. The virtual meeting software 306 is software for implementing virtual meetings between users of two or more clients and/or phones. For example, the virtual meting software 306 can be the virtual meeting software described above with respect to the application server 108 of FIG. 1.

The virtual meeting software 306 includes a dedicated meeting view for each input stream received and processed at the meeting system 300. For example, a meeting view may be represented within a graphical user interface (GUI) of the virtual meeting software 306 by a dedicated box for a given participant. The content of the meeting view for a given participant may be dependent upon the source of the input stream for that participant. For example, where a participant accesses the virtual meeting software 306 from a client, such as the client 308 or 310, the meeting view for the participant may include a video output stream transmitted from the meeting system for viewing by all participants based on a video input stream received from the client, although the participant may optionally disable video features to suspend the video output stream from being presented in the meeting view. In another example, where a participant access the virtual meeting software 306 from a phone, such as the phone 312, the meeting view for the participant may be limited to a static image or other default background aspect since there is no video output stream produced for that participant.

The thread encoding tool 302 receives video input streams separately from the clients 308 and 310 and encodes those video input streams using one or more transcoding tools, such as to produce variant streams at different resolutions. The video input streams may be received over a network, for example, the network 114 shown in FIG. 1, or by a direct wired connection, such as using a universal serial bus (USB) connection or like coupling aspect. After the video input streams are encoded, the switching/routing tool 304 direct the encoded streams through applicable network infrastructure and/or other hardware to deliver the encoded streams to the virtual meeting software 306. The virtual meeting software 306 delivers output video streams representative of the respective encoded streams to each connected client, such as the clients 308 and 310, which receive and decode the output video streams to output them for display by video output components of the clients, such as within respective meeting views of the virtual meeting software 306.

A user of the phone 312 participates in the virtual meeting using an audio-only connection and may be referred to an audio-only caller. To participate in the virtual meeting from the phone 312, an audio signal from the phone 312 is received and processed at a VOIP gateway 314 to prepare a digital telephony signal for processing at the meeting system 300. The VOIP gateway 314 may be part of the system 100, for example, implemented at or in connection with a server of the datacenter 106. Alternatively, the VOIP gateway 314 may be located on the user-side, such as in a same location as the phone 312. The digital telephony signal is a packet switched signal transmitted to the switching/routing tool 304 for delivery to the virtual meeting software 306. The virtual meeting software 306 outputs an audio signal representing a combined audio capture for each participant of the virtual meeting for output by an audio output component of the phone 312. In some implementations, the VOIP gateway 314 may be omitted, for example, where the phone 312 is a VOIP-enabled phone.

A virtual meeting may be referred to as a video-enabled virtual meeting in which video streaming is enabled for one or more participants. The enabling of video streaming for a participant of a virtual meeting does not require that the participant activate or otherwise use video functionality for participating in the virtual meeting. For example, a virtual meeting may still be a video-enabled virtual meeting where none of the participants joining using clients turns on their video feed for any portion of the virtual meeting. In some cases, however, the virtual meeting may have video disabled, such as where each participant connects to the virtual meeting using a phone rather than a client, or where a host of the virtual meeting selectively configures the virtual meeting to exclude video functionality.

In some implementations, other software services may be accessible in connection with a virtual meeting implemented using the meeting system 300. For example, a virtual meeting may include or otherwise integrate functionality for instant messaging, unified messaging, and other types of messaging communications between participants of the virtual meeting, such as to facilitate a chat or like virtual conversation between users of those participants. Those other software services may be implemented at the meeting system 300 and/or a different aspect of the system 100.

Figure 4:
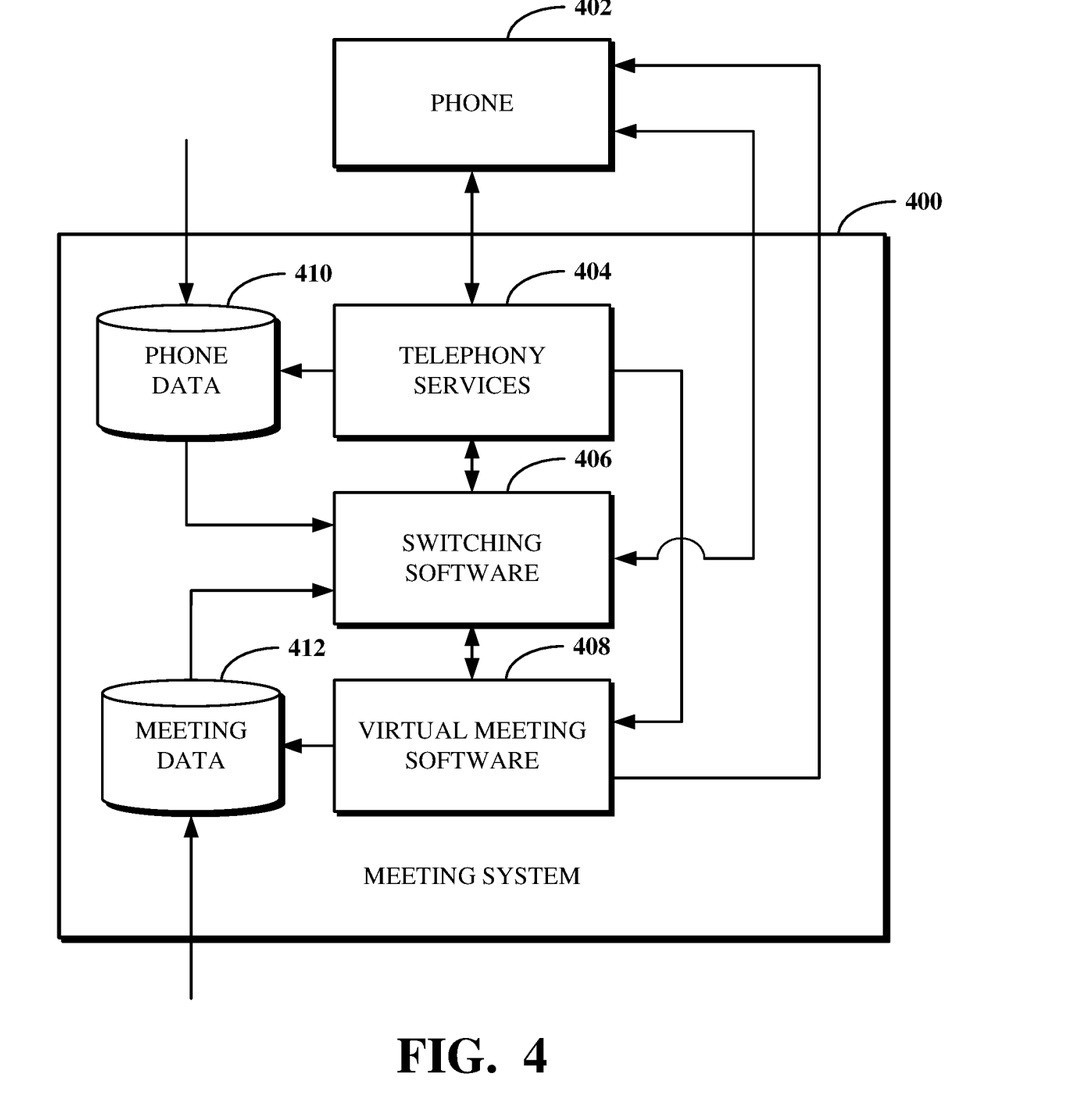
FIG. 4 is a block diagram of an example of a meeting system for elevating a telephone call to a virtual meeting.

FIG. 4 is a block diagram of an example of a meeting system 400 for elevating a telephone call to a virtual meeting. The meeting system 400 may, for example, be the meeting system 300 shown in FIG. 3. A phone device 402 of an audio-only caller, which may, for example, be the phone 308 shown in FIG. 3, is connected to a telephone call over telephony services 404. The telephone call may be switched by switching software 406 to a virtual meeting implemented by virtual meeting software 408, which may, for example, be the virtual meeting software 302 shown in FIG. 3.

The meeting system 400 may be implemented using one or more servers, for example, of a datacenter such as the datacenter 106 shown in FIG. 1. For example, the meeting system 400 may be implemented using an application server, a database server, and/or a telephony server, such as the servers 108 through 112 shown in FIG. 1. In another example, the meeting system 400 may be implemented using servers not shown in FIG. 1, for example, a meeting server, a web server, or another server. In yet another example, the meeting system 400 may be implemented using one or more of the servers 108 through 112 and one or more other servers. The telephony services 404, the switching software 406, and the virtual meeting software 408 may be implemented by different servers or by the same server.

As shown, the switching software 406 is separate from both of the telephony services 404 and the virtual meeting software 408. However, in some implementations, the switching software 406 may be included in one or both of the telephony services 404 and the virtual meeting software 408. For example, the switching software 406 may represent functionality of the telephony services 404 and/or of the virtual meeting software 408 for transitioning a telephone call at the telephony services 404 to a virtual meeting at the virtual meeting software 408.

The telephony services 404 represent hardware, software, infrastructure, and/or other aspects used to operate a telephony connection, such as a telephone call between two or more clients or phones, including the phone device 402. For example, the telephony services 404 may be implemented using the telephony server 112 shown in FIG. 1. In another example, the telephony services may be implemented using the thread encoding tool 310, the switching/routing tool 312, and/or the VOIP gateway 314 shown in FIG. 3, such as where those aspects are implemented other than as part of the telephony server 112. The operator of a client or phone connected to the telephone call may or may not be a user of a software platform associated with the meeting system 400. An operator of a client or phone may, for example, be a human user, a software intelligence unit, or another entity.

The switching software 406 includes functionality for switching a telephone call implemented using the telephony services 404 to a virtual meeting implemented using the virtual meeting software 408. During the telephone call, a request to switch the telephone call to a virtual meeting is transmitted from a client or phone of a participant of the telephone call. The participant whose client or phone transmitted the request to switch the telephone call to a virtual meeting may or may not be an audio-only caller; however, at least one participant of the telephone call is an audio-only caller. The switching software 406 detects the request to switch the telephone call and processes the request to ultimately cause the participants of the telephone call to become participants of a virtual meeting at the virtual meeting software 408, in which at least some participants (e.g., audio-only callers) will have the telephone call be used as the audio channel for the virtual meeting.

The switching software 406 directs the virtual meeting software 408 to create the virtual meeting based on the request received from the participant. To switch a participant other than an audio-only caller (e.g., a video-capable caller operating a client device or a phone device through a client application) to the virtual meeting, the switching software may transmit a push notification or in-app message that, when interacted with at the device of the participant, causes the client application running on that device to connect to a web service used for the virtual meeting software 408. Video and audio channels are opened and may be selectively controlled (e.g., by the operator of the device) to provide video and audio streams for the participant directly through the virtual meeting software 408.

However, to switch a participant who is an audio-only caller (e.g., a caller operating a phone which may or may not be capable of running a client application but which in any event is connecting to the telephone call other than by using the client application), the switching software 406 first identifies the phone device of the audio-only caller based on telephony traffic processed at the telephony services 404. For example, the telephony services 404 may store information associated with the phone device within a phone data database 410. The phone data database 412 may, for example, be implemented by the database server 110 shown in FIG. 1.

The information associated with a phone device stored by the phone data database 410 includes one or more of a phone number associated with the phone device (e.g., a primary phone number assigned through a carrier network, a secondary phone number enabled through a client installed at the phone device, and/or another phone number), an identifier of an operating system of the phone device (e.g., a smart phone operating system such as Android or iOS, a desktop phone operating system, and/or another operating system), a MAC address of the phone device, a unique identifier generated for the phone device, an indication of whether a client application associated with web service used for the virtual meeting software 408 is installed on the phone device 402, or the like.

The telephony services 404 may store the information associated with the phone device 402 in the phone data database 410 based on a connection of the phone device 402 to the telephony services 404. For example, the telephony services 404 may detect the information associated with the phone device 402 upon the phone device 402 accessing a session border controller (SBC) or gateway associated with the telephony services 404 and thereafter store the information within the phone data database 410. Alternatively, the information associated with the phone device 402 may be stored in the phone data database 410 by another aspect associated with the meeting system 400 or a software platform which includes the meeting system 400. For example, the information associated with the phone device 402 may be stored within the phone data database 410 based on a previous interaction between the phone device 402 and the meeting system 400 or the software platform.

The switching software 406 may obtain the information associated with the phone device 402 by accessing the phone data database 410. Alternatively, the information associated with the phone device 402 may be signaled from the telephony services 404 to the switching software 406. In either case, the switching software 406 uses the information associated with the phone device 402 to transmit a message to the phone device 402. The message is an aspect which may be interacted with at the phone device 402 and which is configured to connect the phone device 402 to the virtual meeting at the virtual meeting software 408 responsive to such an interaction. For example, the message may be one of a push notification, a text message, or another prompt which may be delivered to the phone device 402.

The particular form of the message transmitted to the phone device 402 is based on whether a client application associated with the web service used for the virtual meeting software 408 is installed on the phone device 402. In particular, the switching software 406 processes the information associated with the phone device 402 to determine whether the client application is installed on the phone device 402.

Responsive to a determination that the client application is installed on the phone device 402, the switching software 406 transmits the message in the form of a push-notification to the client application installed on the phone device 402. The push-notification, when interacted with, will open the client application at the phone device 402 and connect the phone device 402 to the virtual meeting software 408 accordingly. Thus, the push-notification is configured to cause a connection to open between the phone device 402 and the virtual meeting software 408 regardless of whether the client application is open or otherwise actively being used by the operator of the phone device 402.

Alternatively, responsive to a determination that the client application is not installed on the phone device 402, the switching software 406 transmits the message in the form of a text message to the phone device 402. The text message includes a uniform resource locator (URL) associated with the web service used for the virtual meeting software 408 which, when interacted with at the phone device 402, causes a web browser application at the phone device 402 to connect to the web service at the URL.

Regardless of its form, the message transmitted from the switching software 406 may identify or be used to identify, either directly or indirectly, a meeting identifier for the virtual meeting to which the telephone call is being switched. For example, where the message is a text message including a URL, the meeting identifier may be identified by the message by the URL embedding the meeting identifier. In another example, where the message is a push notification, the push notification may connect the audio-only caller to the virtual meeting based on a meeting identifier associated with the virtual meeting.

The meeting identifier is some information for uniquely identifying a particular virtual meeting implemented at the virtual meeting software 408. The meeting identifier may be obtained by the switching software 406 in one or more ways. In one example, the switching software 406 may obtain the meeting identifier from a meeting data database 412. The meeting data database 412 may, for example, be implemented by the database server 110. The meeting data database 412 stores information associated with virtual meetings previously and/or currently implemented at the virtual meeting software 408. The information associated with a virtual meeting stored in the meeting data database 412 may, for example, include one or more of a meeting identifier, a list of participants (e.g., by device, telephone number, account, or the like), information indicating a start and/or end time, or the like. At least some of the information associated with a virtual meeting may be stored in the meeting data database 412 by the virtual meeting software 408. In another example, the switching software 406 may obtain the meeting identifier directly from the virtual meeting software 408. For example, the virtual meeting software 408 may signal the meeting identifier to the switching software 406 responsive to a request therefor from the switching software 406 and/or responsive to the virtual meeting software 408 initializing the virtual meeting. In some implementations, information stored in the meeting data database 412 may be stored there by another aspect of the meeting system of the software platform associated with the meeting system.

After the switching software 406 transmits the message to the phone device 402, an interaction with the message at the phone device 402 begins the process of the switching software 406 opening a channel between the phone device 402 and the virtual meeting software 408. The channel may, for example, represent a connection pathway between the phone device 402 and the virtual meeting software 408 over a network directed based on the meeting identifier. The switching software 406 may in at least some cases signal the connection of the phone device 402 to the virtual meeting software 408 or the opening of the channel therefor to the telephony services 404. Once the channel is opened, a meeting session is established with the virtual meeting software 408. A SIP transaction may be created and processed between the telephony services 402 and the virtual meeting software 408 (e.g., between devices thereof) to facilitate the telephone call being accessible to the virtual meeting software 408. In this way, the telephone call is maintained as the audio-channel of the virtual meeting at the virtual meeting software 408 for at least some of the participants, such as the audio-only caller.

In some implementations, the channel between the phone device 402 and the virtual meeting software may be opened responsive to authenticating the audio-only caller. For example, after the message is interacted with at the phone device 402 and the switching software 406 receives an indication of such message interaction, the switching software 406 can authenticate the audio-only caller using information stored in the phone data database 410. For example, the audio-only caller may be authenticated based on one or more of the phone number used by the phone device 402, a MAC address of the phone device 402, or the like. In some implementations where multiple devices share the same phone number, the audio-only caller may be authenticated by the switching software 406 identifying which of those multiple devices is currently connected to the telephone call through the telephony services 404.

In some implementations, the elevation of the telephone call to a virtual meeting exposes the participants to various virtual meeting functionality of the virtual meeting software 408. For example, participants, such as the audio-only caller, once connected to the virtual meeting may in at least some cases be able to support one or more of video channel output, screen sharing, chat messaging, file transferring, or other functionality of the virtual meeting software 408.

Figure 5:
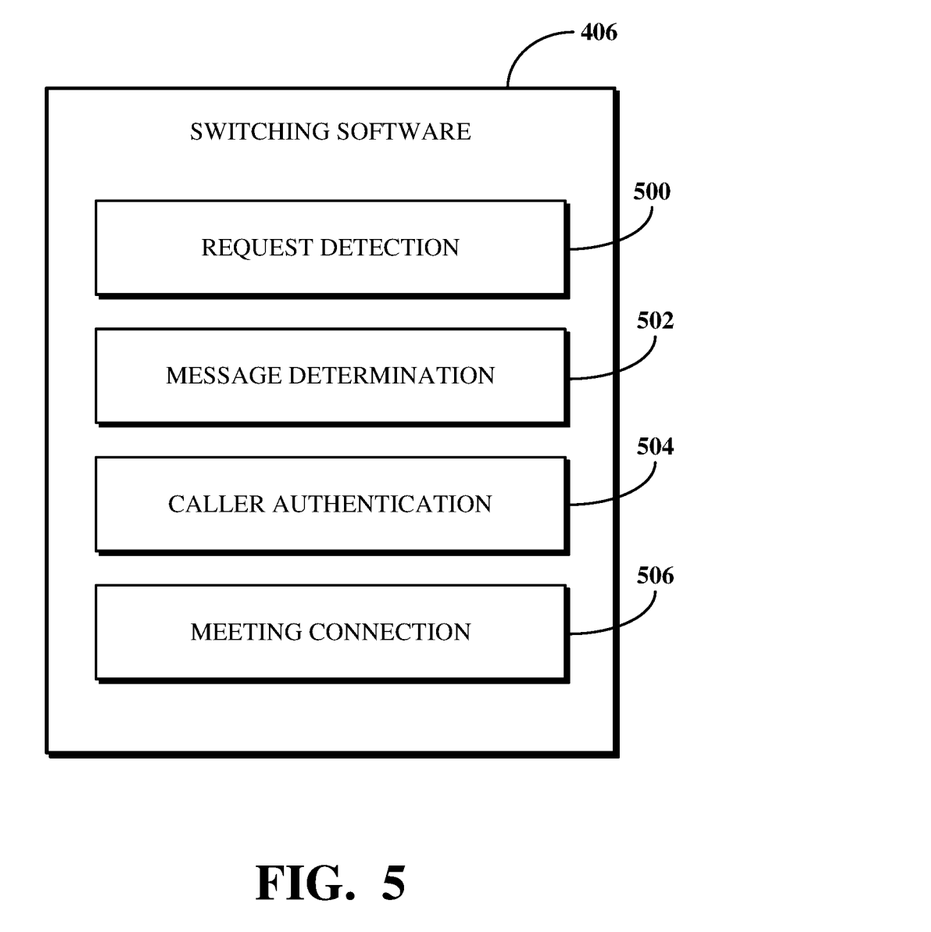
FIG. 5 is a block diagram of example functionality of switching software.

FIG. 5 is a block diagram of example functionality of the switching software 406 shown in FIG. 4. The switching software 406 includes tools for elevating a telephone call to a virtual meeting. As shown, the switching software 406 includes a request detection tool 500, a message determination tool 502, a caller authentication tool 504, and a meeting connection tool 506. Although the tools 500 through 506 are shown as functionality of the switching software 400 as a single piece of software, in some implementations, some or all of the tools 500 through 506 may exist outside of the switching software 406.

The request detection tool 500 detects a request to switch a telephone call to a virtual meeting. The request may be from one or more participants of the telephone call. At least one participant of the telephone call is an audio-only caller. The request detection tool 500 may detect the request in one or more ways. For example, the detection may be based on a signal received from telephony services used to implement the telephone call. In another example, the detection may be based on a signal received from a web service used to implement the virtual meeting, for example, the virtual meeting software 408 shown in FIG. 4.

The message determination tool 502 determines and transmits a message based on whether a client application associated with a web service used to implement the virtual meeting is installed on the phone device of the audio-only caller. Determining whether the client application is installed on the phone device can include transmitting a request for response by the client application, such as a ping, to the phone device, and awaiting that response. Alternatively, determining whether the client application is installed on the phone device may include searching records of the virtual meeting software or of a software platform associated therewith to determine whether an account associated with the phone device is registered therewith. For example, the message determination tool 502 or another aspect of the switching software 406 may perform phone number matching against the phone number of the phone device to recognize the phone device and determine whether the client application is installed thereon.

The particular form of the message is based on whether the client application is installed on the phone device. For example, when the client application is installed on the phone device, the message may include a push notification transmitted to the client application. In another example, when the client application is not installed on the phone device, the message may include a text message transmitted to the phone device.

The caller authentication tool 504 authenticates the audio-only caller of the phone device using information associated with the phone device, for example, the phone number thereof. For example, responsive to an interaction with the message at the phone device, the caller authentication tool 504 or another aspect of the switching software 406 may obtain a phone number of the device, for example, from the telephony services 404 shown in FIG. 4 or from another source. The obtained phone number may then be compared against phone data records known to the meeting system which includes the switching software 406, for example, the phone data database 410 shown in FIG. 4. In some implementations, the authentication may be by using information associated with the phone device other than or in addition to the phone number. For example, a MAC address, unique identifier, or other information stored in the phone data database 410 may be used to authenticate the audio-only caller. In some implementations, the authentication may occur before the message is transmitted to the phone device. For example, the authentication can be done to verify a system API used to interface with the phone device, such as for transmitting the message.

The meeting connection tool 506 opens a channel between the phone device and the virtual meeting software to allow the phone device to connect to the virtual meeting. The meeting connection tool 506 further uses the existing connection between the phone device and the telephony services to cause the telephone call to be used as the audio channel for the audio-only caller within the virtual meeting. There is, as a result, no change in operation and no gap in communication between the audio-only caller and the other participants of the virtual meeting.

Figure 6A:
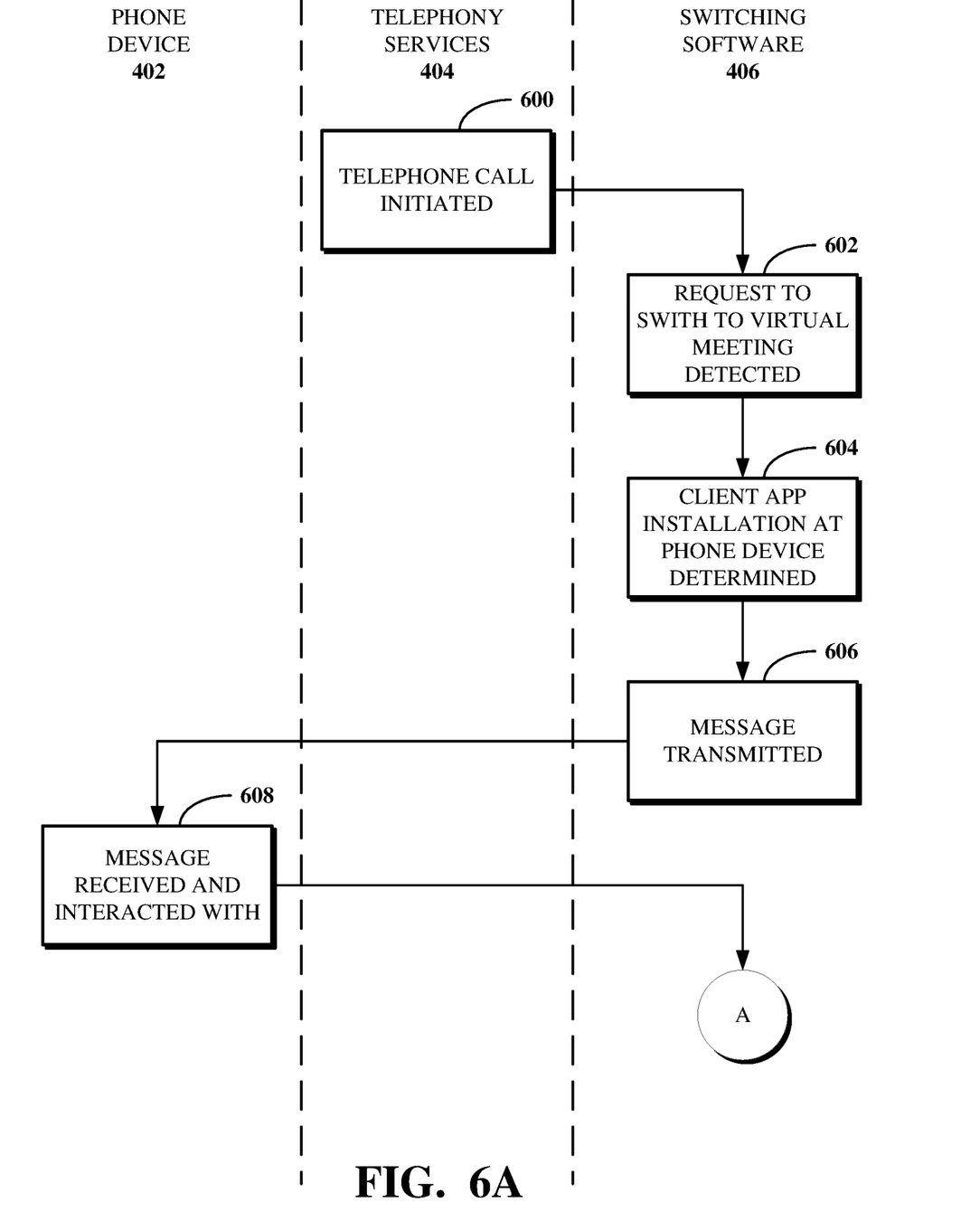
FIGS. 6A-B are illustrations of swim lanes showing an example sequence of operations performed for elevating a telephone call to a virtual meeting.
Figure 6B:
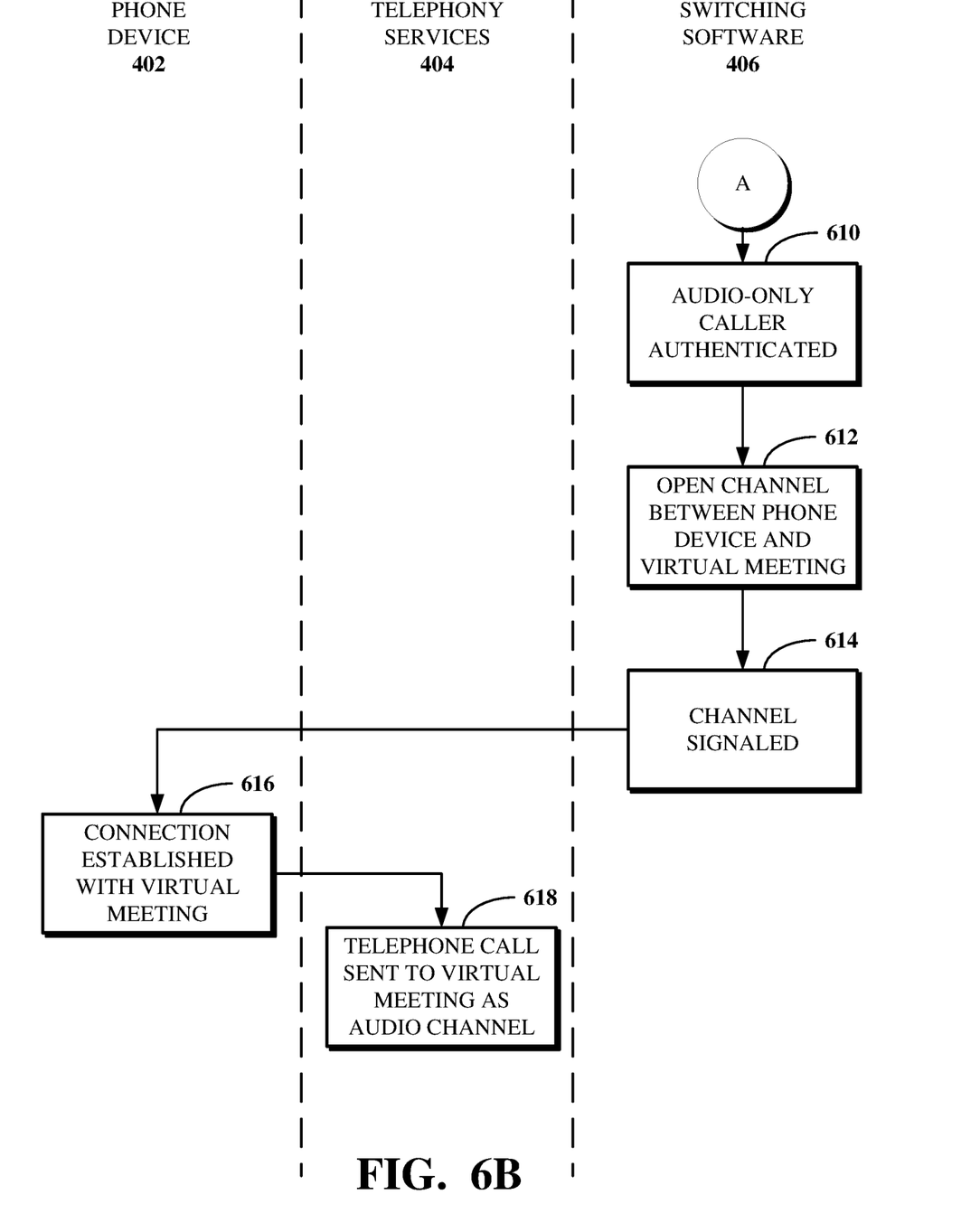

FIGS. 6A-B are illustrations of swim lanes showing an example sequence of operations performed for elevating a telephone call to a virtual meeting between the phone device 402, the telephony services 404, and the switching software 406 shown in FIG. 4. Referring first to FIG. 6A, at 600, a telephone call is initiated at the telephony services 404. At 602, the switching software 406 detects a request to switch the telephone call to a virtual meeting. At 604, the switching software 406 determines whether a client application associated with a web service for implementing the virtual meeting is installed at the phone device 402. At 606, a message configured to connect the phone device 402 to the web service is transmitted from the switching software 406 to the phone device 402. At 608, the message is received and interacted with at the phone device 402.

Referring next to FIG. 6B, after the message is received and interacted with at the phone device 402, at 610, the audio-only caller operating the phone device 402 is authenticated by the switching software 406. At 612, a channel is opened by the switching software 406 between the phone device 402 and the web service used to implement the virtual meeting. At 614, the switching software 406 signals the channel to the phone device 402. At 616, a connection is established between the phone device 402 and the web service for the virtual meeting. At 618, the telephony services 404 send the telephone call to the web service to use as an audio-channel of the virtual meeting for at least the audio-only caller.

Figure 7:
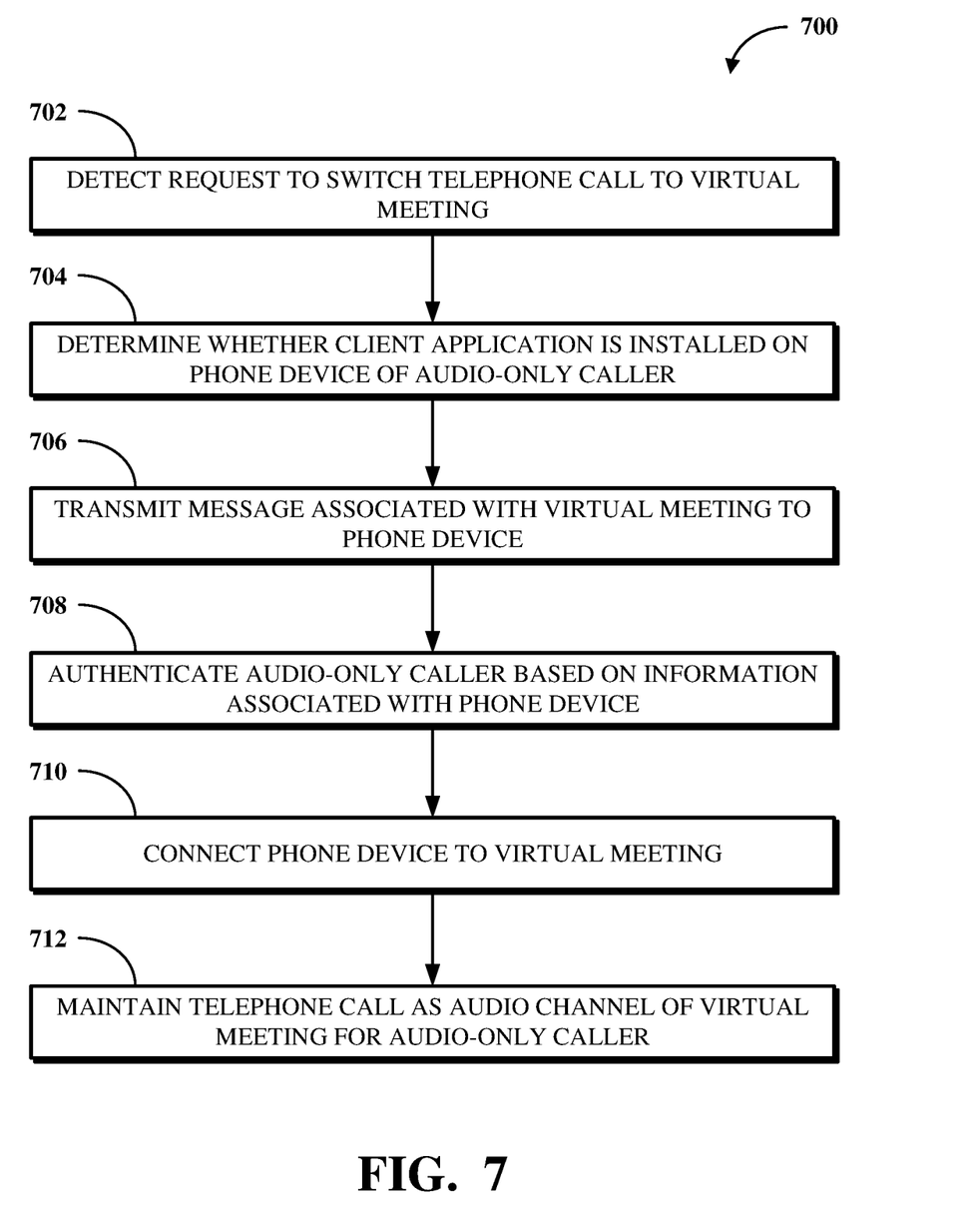
FIG. 7 is a flowchart of an example of a technique for elevating a telephone call to a virtual meeting.

To further describe some implementations in greater detail, reference is next made to examples of techniques which may be performed to elevate a telephone call to a virtual meeting. FIG. 7 is a flowchart of an example of a technique 700 for elevating a telephone call to a virtual meeting. The technique 700 can be executed using computing devices, such as the systems, hardware, and software described with respect to FIGS. 1-6B. The technique 700 can be performed, for example, by executing a machine-readable program or other computer-executable instructions, such as routines, instructions, programs, or other code. The steps, or operations, of the technique 700 or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, a request to switch a telephone call to a virtual meeting is detected. The request may be from one or more participants of the telephone call. At least one participant of the telephone call is an audio-only caller. The detection may in at least some cases be based on a signal received from telephony services used to implement the telephone call. Alternatively, or additionally, the detection may be based on a signal received from a web service used to implement the virtual meeting.

At 704, a determination is made as to whether a client application associated with a web service used to implement the virtual meeting is installed on the phone device of the audio-only caller. For example, determining whether the client application is installed on the phone device can include transmitting a request for response by the client application, such as a ping, to the phone device. The client application is determined to be installed on the phone device if a response is received. In another example, determining whether the client application is installed on the phone device may include searching records of software used to implement the virtual meetings or of other software to determine whether an account associated with the phone device is registered therewith. For example, a phone data database may be searched for a phone number or MAC address of the phone device. In the event such information is identified, an implication can be drawn that the operator of the phone device has registered the phone device with the service and thus that the client application may be installed on the phone device.

At 706, a message associated with the virtual meeting is transmitted to the phone device of the audio-only caller. The message may be based on whether a client application associated with a web service used to implement the virtual meeting is installed on the phone device. For example, when the client application is installed on the phone device, the message may include a push notification transmitted to the client application. In such a case, the interaction with the push notification may cause the client application to connect to the virtual meeting at the phone device. In another example, when the client application is not installed on the phone device, the message may include a text message transmitted to the phone device. In such a case, the interaction with the text message may cause a web browser application at the phone device to connect to the virtual meeting.

At 708, the audio-only caller is authenticated based on information associated with the phone device. The authentication is responsive to an interaction with the message at the phone device. The particular manner of the authentication may be based on the message transmitted to the phone device of the audio-only caller. For example, when the client application is installed on the phone device, the message may configure the client application to authenticate the audio-only caller using information associated with the phone device. In another example, when the client application is not installed on the phone device, the message may include a URL that embeds a meeting identifier of the virtual meeting and a participant identifier that authenticates the audio-only caller.

In some implementations, responsive to determining that the phone number is associated with multiple phone devices, authenticating the audio-only caller can include verifying that the phone device is the one of the multiple phone devices connected to the telephone call. For example, it may be the case that the phone device is one of multiple devices known by the software to use the same phone number. In some such implementations, the phone device can be verified based on telephony services used to implement the telephone call. For example, the telephony services may be queried for a list of device endpoints connected to the telephone call, and the multiple phone devices known to the software can be compared to the list. In some such implementations, a text message may be transmitted to the phone device to request verification by the operator thereof that the phone device is the one seeking to join the virtual meeting. For example, the text message may be transmitted responsive to a determination that multiple phone devices are known as being associated with the phone number.

In some implementations, the authentication may occur before the message is transmitted to the phone device. For example, the authentication can be done to verify a system API used to interface with the phone device, such as for transmitting the message.

At 710, the phone device is connected to the virtual meeting. For example, responsive to authenticating the audio-only caller, a channel may be opened between the phone device and a web service used to implement the virtual meeting. The channel connects the phone device to the virtual meeting service. In some implementations, connecting the phone device to the virtual meeting may expose the audio-only caller to one or more of a video channel, a screen share, a chat message, or a file transfer.

At 712, the telephone call is maintained as the audio channel of the virtual meeting for at least the audio-only caller. Maintaining the telephone call as the audio channel includes binding the audio channel of the telephone call to a video channel of the audio-only caller within the virtual meeting. That is, because the video channel and the audio channel are technically separate channels, the binding is performed to link the telephone call to the video feed provided for the audio-only caller within the virtual meeting. Given that the audio-only caller does not provide a video stream, the video feed for the audio-only caller is typically a static image.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
  receiving, at a device connected to a telephone call, a message indicative of a request from another device connected to the telephone call to switch the telephone call to a virtual meeting, wherein the message is received as a text message based on a client application associated with a web service used to implement the virtual meeting not being installed on the device; and
  connecting, by the device, to the virtual meeting by causing, based on an interaction with the message at the device, a processing of a session initiation protocol transaction between the web service and a telephony service used to implement the telephone call.

2. The method of claim 1, wherein the message embeds a meeting identifier and a participant identifier that.

3. The method of claim 1, wherein the telephone call is maintained as an audio channel of the virtual meeting for the device.

4. The method of claim 1, wherein connecting to the virtual meeting comprises:
  opening, based on the interaction with the message, a web browser application at the device; and
  connecting, by the device, to the virtual meeting using the web browser application and a uniform resource locator included in the message.

5. The method of claim 1, wherein the connection of the device to the virtual meeting is based on an authentication of a user of the device using information associated with the device.

6. A non-transitory computer readable medium storing instructions operable to cause one or more processors to perform operations comprising:
  receiving, at a device connected to a telephone call, a message indicative of a request from another device connected to the telephone call to switch the telephone call to a virtual meeting, wherein the message is received as a text message based on a client application associated with a web service used to implement the virtual meeting not being installed on the device; and
  connecting, by the device, to the virtual meeting by causing, based on an interaction with the message at the device, a processing of a session initiation protocol transaction between the web service and a telephony service used to implement the telephone call.

7. The non-transitory computer readable medium of claim 6, wherein the operations for connecting to the virtual meeting comprise:
  transmitting, from the device based on the interaction with the message, a request to connect the device to the virtual meeting, wherein the request to connect the device to the virtual meeting causes a server used by the web service to authenticate the device using information associated with the device.

8. The non-transitory computer readable medium of claim 6, wherein a video channel used by the device within the virtual meeting is bound to an audio channel maintaining the telephone call as audio of the virtual meeting for the device.

9. The non-transitory computer readable medium of claim 6, wherein the message includes a participant identifier used to authenticate a user of the device.

10. The non-transitory computer readable medium of claim 6, wherein the message is received from the web service.

11. The non-transitory computer readable medium of claim 6, wherein the telephone call is maintained as an audio channel of the virtual meeting for the device and bound to a video channel associated with the device within the virtual meeting.

12. A device, comprising:
a memory; and
a processor configured to execute instructions stored in the memory to:
receive, at the device while the device is connected to a telephone call, a message indicative of a request from another device connected to the telephone call to switch the telephone call to a virtual meeting, wherein the message is received as a text message based on a client application associated with a web service used to implement the virtual meeting not being installed on the device; and
connect, by the device, to the virtual meeting by causing, based on an interaction with the message at the device, a processing of a session initiation protocol transaction between the web service and a telephony service used to implement the telephone call.

13. The device of claim 12, wherein the processor is configured to execute the instructions to:
determine whether the client application is installed on the device based on the receipt of the message.

14. The device of claim 12, wherein the device is connected to the virtual meeting over a channel opened between the device and the web service based on an authentication of a user of the device.

15. The device of claim 12, wherein, where the client application is installed on the device, the message is a push notification instead of the text message.

16. The device of claim 12, wherein, to connect to the virtual meeting, the processor is configured to execute the instructions to:
cause a channel to open between the device and the web service.

17. The device of claim 12, wherein a connection of the device to the virtual meeting is based on an authentication matching a telephone number associated with the device to a telephone number connected to the telephone call.

18. The device of claim 12, wherein audio of the telephone call is maintained for the device during the virtual meeting.

19. The device of claim 12, wherein a connection of the device to the virtual meeting uses a meeting identifier and a participant identifier embedded by the message.

20. The device of claim 12, wherein a connection of the device to the virtual meeting is established via a web browser application at the device.

* * * * *